United States Patent [19]

Keeton

[11] 4,346,531

[45] Aug. 31, 1982

[54] TRANSFERRING LIQUID ONTO A ROLLER SURFACE

[76] Inventor: John H. Keeton, P.O. Box 278, Campbellsville, Ky. 42718

[21] Appl. No.: 199,365

[22] Filed: Oct. 21, 1980

Related U.S. Application Data

[63] Continuation-in-part of Ser. No. 184,192, Sep. 5, 1980.

[51] Int. Cl.³ ..................... A01M 21/00; A01C 23/00
[52] U.S. Cl. ........................ 47/1.5; 118/260; 401/218
[58] Field of Search ............. 47/1.5, 58; 401/218; 118/260, 207, 265–268; 101/328, 350, 132.5, 147

[56] References Cited

U.S. PATENT DOCUMENTS

| | | | |
|---|---|---|---|
| 2,528,657 | 11/1950 | Hobe | 401/218 |
| 2,533,574 | 12/1950 | Gerlach | 118/620 X |
| 2,612,105 | 9/1952 | Skinner | 101/147 X |
| 2,696,696 | 12/1954 | Tigerman | 47/1.5 |
| 2,832,290 | 4/1958 | Mitchell et al. | 101/132.5 X |
| 2,869,460 | 1/1959 | Worthington | 101/366 X |
| 2,935,818 | 5/1960 | Crane | 47/1.5 |
| 2,979,757 | 4/1961 | Smith | 47/1.5 |
| 3,037,235 | 6/1962 | Goggans | 401/218 |
| 3,138,814 | 6/1964 | Carrona | 401/218 X |
| 3,195,170 | 7/1965 | Howard | 401/218 |
| 3,232,006 | 2/1966 | Atherton et al. | 47/1.5 |
| 3,246,360 | 4/1966 | Yonkers | 401/218 X |
| 3,255,929 | 6/1966 | De Haan | 47/1.5 |
| 4,012,152 | 3/1977 | Lupkes | 401/218 |
| 4,015,907 | 4/1977 | Lodge | 401/84 |
| 4,019,278 | 4/1977 | McKirdy | 47/1.5 |
| 4,187,638 | 2/1980 | Hardy et al. | 47/1.5 |
| 4,208,835 | 6/1980 | Roll et al. | 47/1.5 |
| 4,219,964 | 9/1980 | Dale | 47/1.5 |
| 4,263,745 | 4/1981 | Salahshour | 47/1.5 |

FOREIGN PATENT DOCUMENTS 147753  2/1967  New Zealand ................. 47/1.5

*Primary Examiner*—James R. Feyrer
*Attorney, Agent, or Firm*—Cushman, Darby & Cushman

[57] ABSTRACT

An apparatus for transferring liquid onto the surface of a roller for ultimate transfer onto plants, and a method of constructing a storage tank component of the apparatus. A sponge is disposed in a housing adjacent a roller so that the sponge extends outwardly from the housing into contact with the roller periphery. Liquid is dripped onto the sponge, and excess liquid drains through openings in the bottom of the housing into the storage tank. The storage tank is formed by two plastic pipes bent at a middle portion with an opening between them at the apex of the bend of the top pipe. The top pipe is cut-off to provide an open top complimentary to the sponge housing bottom. Liquid from the tank is recirculated back to the pipe dripping liquid onto the sponge.

13 Claims, 9 Drawing Figures

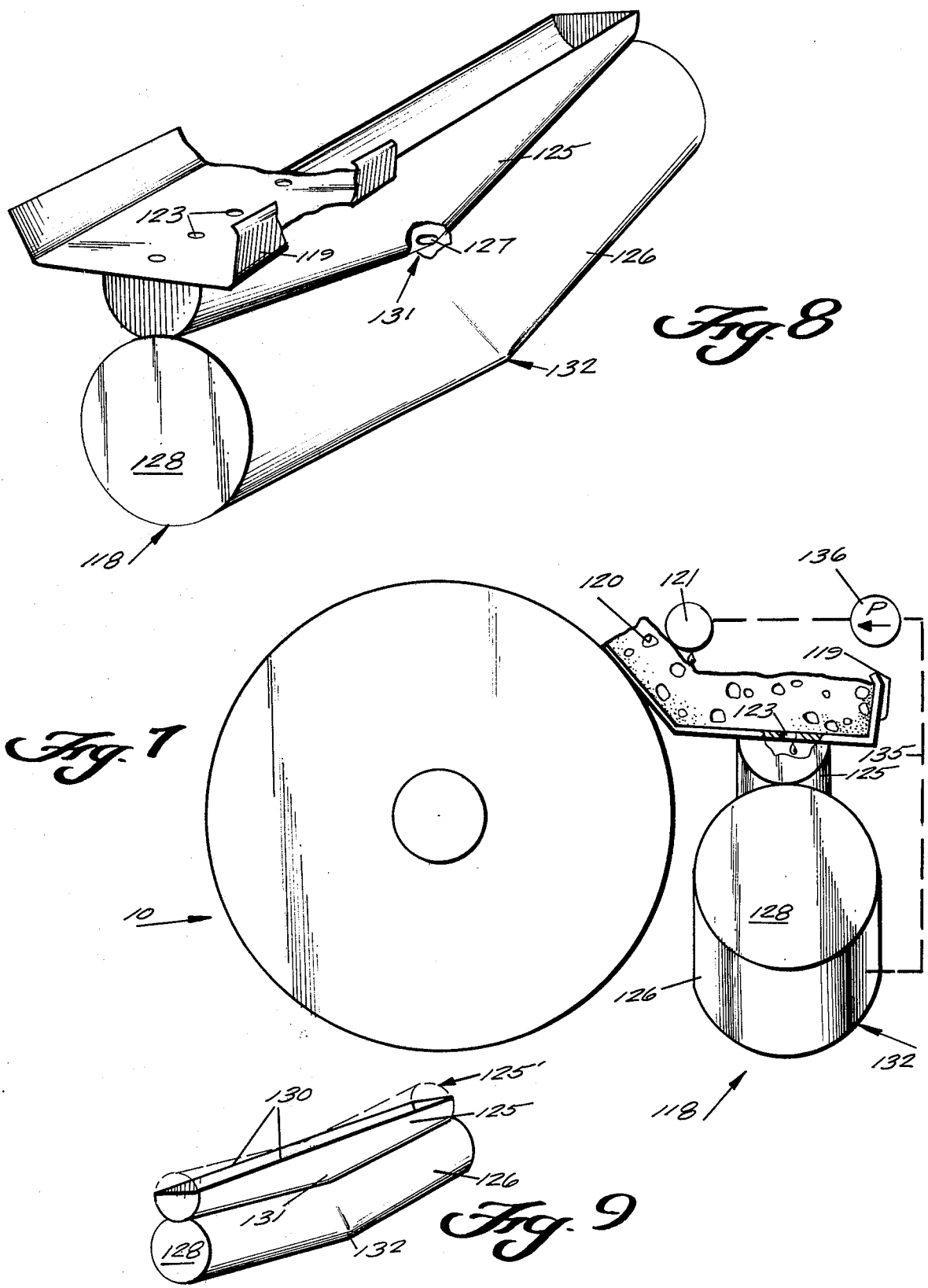

TRANSFERRING LIQUID ONTO A ROLLER SURFACE

CROSS-REFERENCE TO RELATED APPLICATION

This application is a continuation-in-part of application Ser. No. 184,192 filed Sept. 5, 1980.

BACKGROUND AND SUMMARY OF THE INVENTION

The invention relates to a method and apparatus for applying liquids to plants. While the apparatus according to the present invention may be utilized to apply a wide variety of chemicals to plants, the apparatus and method are particularly suited for the application of liquid contact herbicides, such as ROUNDUP manufactured by Monsanto Company, to weeds.

Weed control in growing crops is a continuing problem in agriculture, and a great deal of research has been done in that area and there have been many prior art proposals and procedures for the chemical treatment of weeds. Often times one particular structure is utilized for spraying herbicides in the crop rows between plants, and then another structure is utilized for contacting weeds taller than the crop plants.

Conventional overhead herbicide applicators include recirculating sprayers and rope wick applicators. Both structures can be successful if properly utilized, however recirculating sprayers are quite complex with a tendency to clog, and conventional rope wick applicators can apply less than the desired amount of herbicide to plants unless operating parameters are entirely appropriate. Further, neither system is readily adaptable to between row usage.

According to the method and apparatus of the present invention, a rotating roller is utilized as a primary herbicide-applying component. While the utilization of rotating rollers per se has previously been proposed, such proposed structures conventionally have dripped herbicide onto rollers directly in contact with the ground and have been adapted to be rolled over the ground. Such structures therefore have limited utility for the application of herbicide to weed adjacent crop rows. According to the present invention, a rotating liquid applicator roller is readily utilizable for applying herbicide simply and effectively to weeds between crop rows and to weeds growing above crop rows with equal efficiency. The apparatus according to the invention is readily adapted for mounting to a tractor tool bar, or to be pushed by hand.

According to the method of the present invention, a liquid applicator roller is mounted for rotation about a generally horizontal axis and in operative communication with a reservoir of liquid herbicide. The method includes the steps of: Mounting the applicator roller above the ground and in a position for the peripheral surface thereof to be brought into contact with plants. Effecting movement of the applicator roller in a direction generally perpendicular to the axis of rotation of the roller. And, effecting powered rotation of the applicator roller so that it rotates into contact with plants and continuously transfers liquid from the surface thereof onto the plants, the surface being continuously replenished with liquid from the reservoir. Preferably rotation of the roller is effected in a direction of rotation so that it rotates into plants with which it comes into contact, providing a thorough wiping effect of herbicide onto the plants. The method may be practiced by moving the roller just above ground level between rows of crops, while positively preventing the roller from contacting crops in the rows on either side thereof; or by moving the roller above the tops of the crop plants to contact any plants extending upwardly above the tops of the crop plants.

The apparatus according to the invention includes a liquid applicator roller and a liquid reservoir and means for transferring liquid from the reservoir to the applicator roller surface. The applicator roller preferably comprises a tube of hard plastic having the ends thereof capped with spindles extending outwardly therefrom to define the axis of rotation of the roller. A housing mounts the roller for rotation about a given axis while covering the roller at the top and sides but being open at the bottom to allow the peripheral surface of the roller to rotate out of the housing. The housing also mounts the liquid transferring means. Means are provided for mounting the housing and the roller applicator above the ground, with the axis of rotation of the applicator roller generally horizontal. Preferably a drive wheel is provided, and means are provided for mounting the drive wheel to the housing so that it is rotatable about an axis parallel to the axis of rotation of the applicator roller, with surface means formed on the applicator roller and drive wheel effecting rotation of the applicator roller in response to the rotation of the drive wheel. Preferably the direction of rotation of the applicator roller is opposite to the direction of rotation of the drive wheel.

When the drive wheel is utilized, it is mounted to one side of the housing while the other side of the housing is either mounted to the tractor tool bar or to a pair of ground engaging wheels. Horizontally spaced and elongated plates mounted to the housing adapt the housing for mounting either to a tool bar or to ground engaging wheels. Where a drive wheel is not utilized, the applicator roller may be powered by a motor mounted on a tractor.

A liquid pool is defined within the housing substantially the entire width thereof, corresponding to the applicator roller length. Thelevel of liquid in the pool is substantially even with the axis of rotation of the applicator roller. Transfer of liquid from the pool to the roller may be effected utilizing a sponge, or a pair of transfer rollers. Where the apparatus is utilized between crop rows, preferably a wiper is provided mounted to the housing to wipe any liquid off the roller periphery after plant contact and before a given portion of the roller rotates back into the housing through the housing open bottom. A more remote liquid reservoir may be provided, with a conduit leading from the liquid reservoir to the pool and with a level-responsive valve located in association with the conduit.

The invention also contemplates a particular apparatus for transfering liquid in general onto a surface of a roller utilizing a housing with a liquid-transfering element in the housing and extending into contact with the roller surface, and a manner of construction thereof. A storage tank formed by two pipes bent and cut in particular manners is mounted below the housing, and openings are provided in the bottom of the housing for draining excess liquid in the housing into the storage tank, a drain shape being provided for upper portions of the storage tank. A liquid applicator pipe is mounted above the liquid-transfering element (which preferably comprises a sponge) for dripping liquid onto the liquid-transfering element. A pump, disposed in a conduit between the storage tank and the pipe, pumps liquid from the tank to the pipe.

It is the primary object of the present invention to provide a simple and efficient mechanism for applying liquid to a roller (particularly for applying herbicide to a roller for ultimate transfer to plants), and a simple manner of construction thereof. This and other objects of the invention will become clear from an inspection of the detailed description of the invention, and from the appended claims.

BRIEF DESCRIPTION OF THE DRAWINGS

FIG. 7 is a view like that of FIG. 3 only showing an alternative manner of mounting the sponge liquid-transfering element, and with components for driving and mounting the roller removed for clarity of illustration;

FIG. 8 is a perspective view, with the sponge removed and with portions of the housing cut away for clarity of illustration, of the apparatus of FIG. 7 for transfering liquid to the roller; and FIG. 9 is a schematic view illustrating an exemplary manner of construction of the storage tank of FIGS. 7 and 8.

DETAILED DESCRIPTION OF THE DRAWINGS

Figure 2:
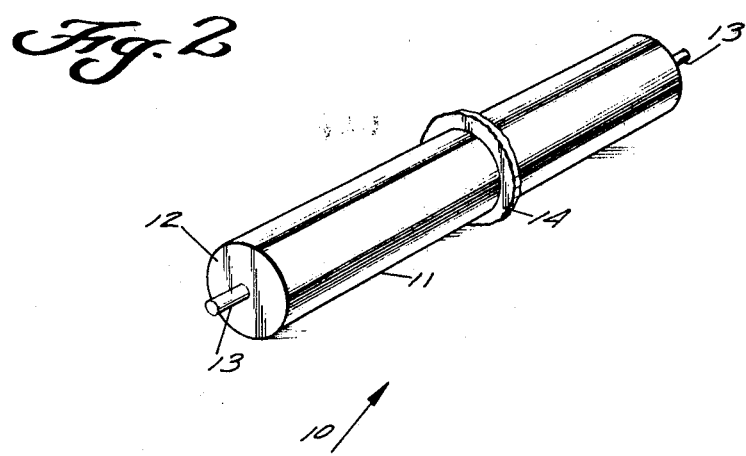
FIG. 2 is a detailed perspective view of an exemplary liquid applicator roller utilized in the apparatus of FIG. 1.

One of the basic components of the apparatus for applying liquid to plants according to the preferred embodiment of the present invention is a liquid applicator roller 10 (see FIGS. 2-4 in particular) for actually contacting plants and transferring liquid from the roller surface 11 to the plants. As illustrated most clearly in FIG. 2, the roller 10 can comprise a hard plastic tube with a pair of end caps 12 with spindles 13 extending outwardly from the end caps and defining the axis of rotation of the roller 11. A raised surface manifestation, such as rough surfaced ring 14 (see FIG. 2) is preferably provided at a central location along the roller 10, for cooperation with a drive wheel as will be hereinafter described.

Figure 5:
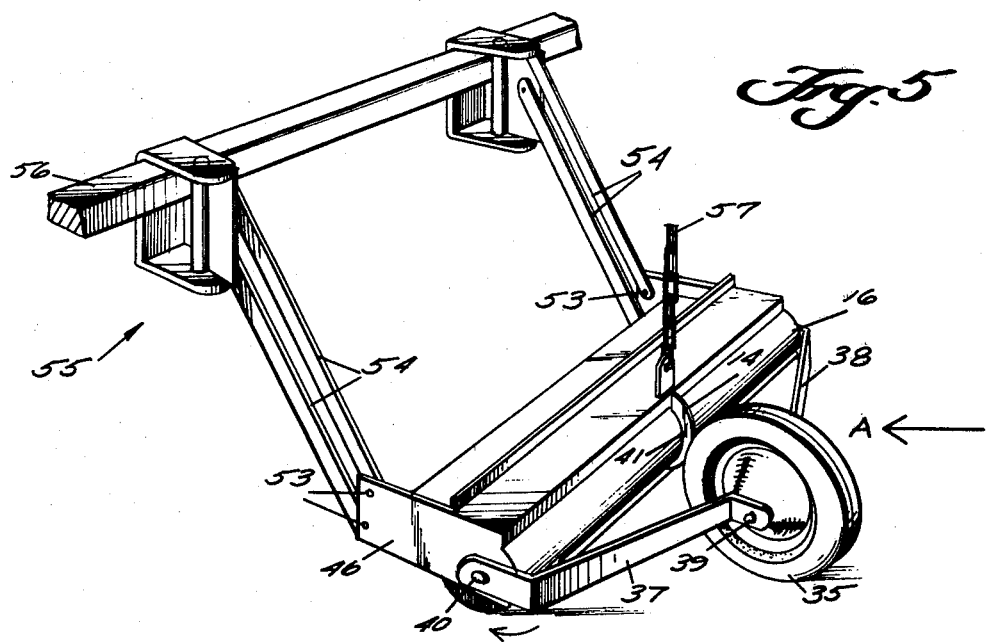
FIG. 5 is a perspective view of the basic apparatus of FIG. 1 shown mounted in conjunction with a tractor tool bar.

The liquid applicator roller 10 is mounted within a housing 16, with the spindles 13 extending to side walls of the housing and bearings (not shown) being provided for allowing rotation of the roller 10 with respect to the housing 16. The housing covers the roller 10 on top and along all four sides, however the housing is open at the bottom to allow the peripheral surface of the roller 10 to rotate out of the housing open bottom, as illustrated most clearly in FIGS. 3, 5 and 6.

A liquid reservoir is provided for supplying liquids, such as contact herbicide, to be transferred onto the peripheral surface 11 of the roller 10 to ultimately be moved into contact with plants. Means are provided for defining a liquid pool 18 in the housing extending substantially the entire width of the housing 16, which corresponds to substantially the entire length of the roller 10. The liquid pool 18 could itself comprise the liquid reservoir, however in some situations the amount of liquid in the pool 18 would not be suitable for extended operation of the apparatus. In such cases another remote liquid reservoir 20 (see FIG. 3) would be provided, with a conduit 21 extending from the liquid reservoir to the pool 18. Means are provided for transferring liquid from the reservoir to the applicator roller so that a film of liquid is deposited on the surface 11 just before it contacts plants. Such liquid transferring means may take a wide variety of forms.

Figure 3:
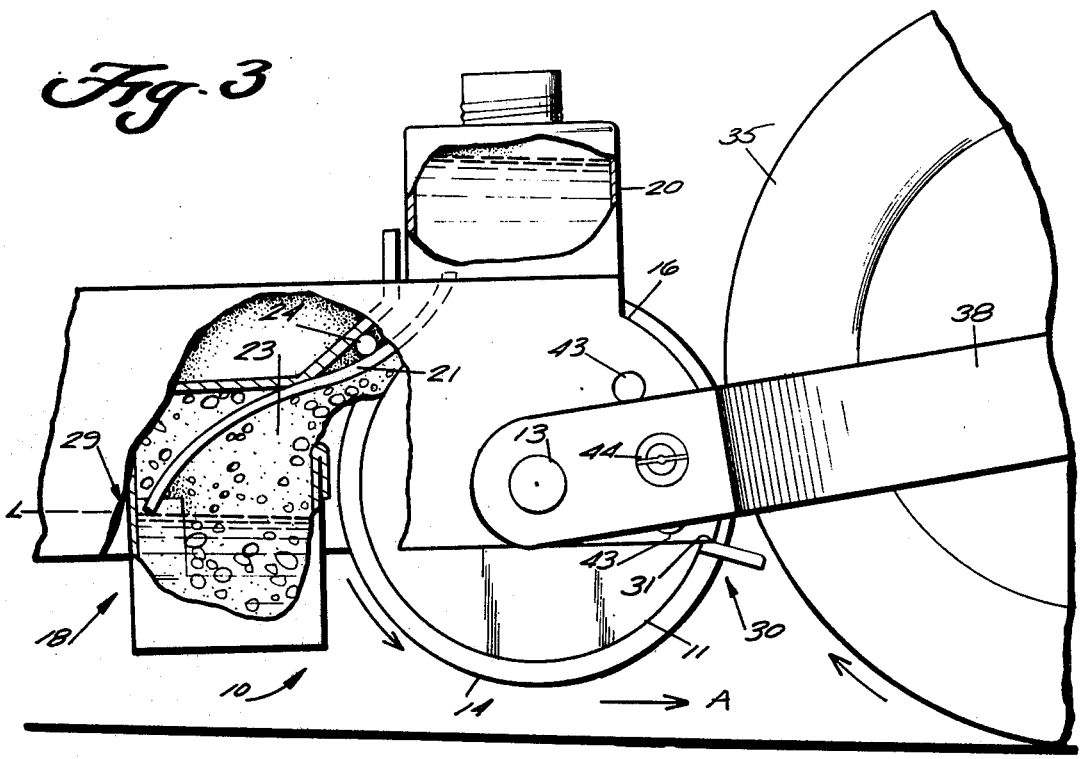
FIG. 3 is a side detailed view, partly in cross-section and partly in elevation, of a modified form of the apparatus of FIG. 1.

One form that the liquid transferring means according to the invention can take, is illustrated in FIG. 3, comprises a sponge 23 disposed in the liquid pool 18 and extending outwardly from the pool into engagement with the periphery 11 of the applicator roller 10. The sponge conducts liquid from the pool 18 up into contact with the roller periphery 11. To insure that the sponge is always moist at the area of engagement with the roller periphery 11, a structure 24, which preferably comprises a tube having a plurality of openings in the bottom thereof, is mounted above the sponge 23 to drip water onto the sponge 23 substantially over the entire width thereof. The tube 24 is preferably in liquid-communicating relationship with the conduit 21, although it can be supplied liquid from another source.

Figure 4:
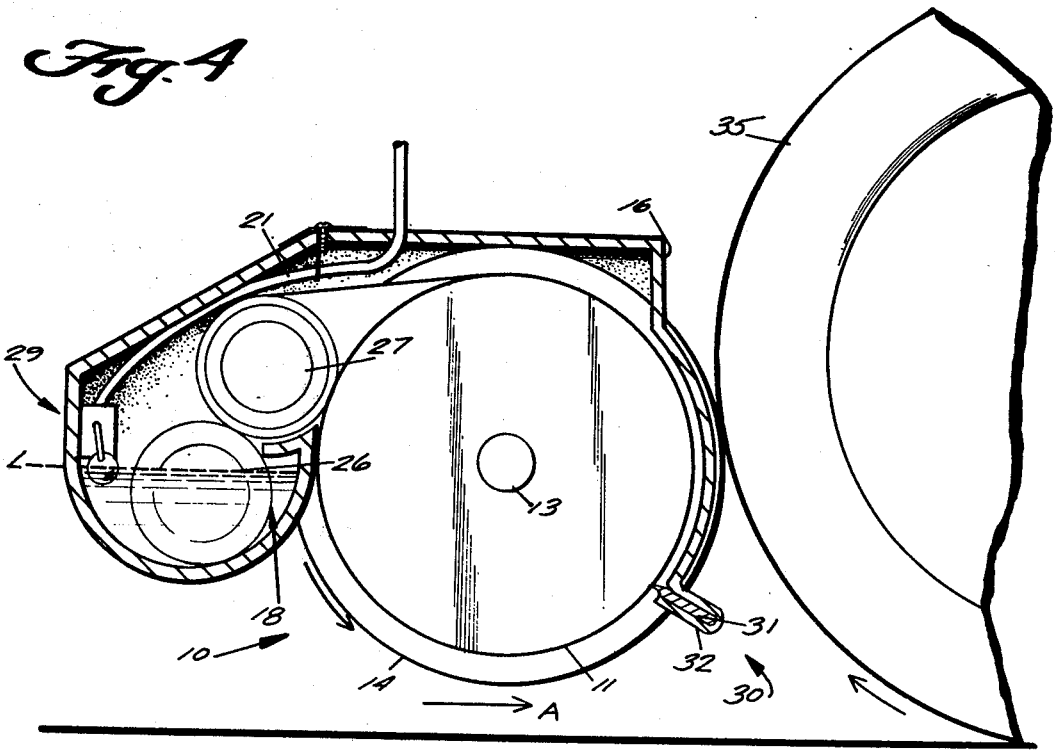
FIG. 4 is a side detailed view, partly in cross-section and partly in elevation, of another modified form of the apparatus of FIG. 1.

Another form that the liquid transferring means may take is illustrated most clearly in FIG. 4, and comprises first and second transfer rollers 26, 27. The first roller 26 is mounted for rotation in the pool 18 and the second roller 27 is mounted for rotation between the pool 18 and the applicator roller 10 and in surface-to-surface contact with both. Both transfer rollers 26, 27 are rotatable about axes parallel to the axis of rotation of the roller, and are preferably mounted for this rotation about axles received in sides of the housing 16.

Both with respect to the FIGS. 3 and 4 embodiment, where a remote liquid reservoir 20 is provided, the liquid transferring means includes—in addition to the transfer means which comprise the sponge 23 or the rollers 26, 27—the conduit 21 and valve means, illustrated generally at 29, responsive to the level L of liquid within the pool 18, for preventing or allowing flow of liquid through the conduit 21 to the pool 18 in response to the level of liquid in the pool. The valve means may comprise a conventional float operated valve. Preferably the liquid pool 18 is positioned in the housing 16 adjacent one side of the roller 10, and the valve means 29 are actuated so that the liquid level L maintained in the pool 18 is at about the same horizontal level as the axis of rotation of the roller 10 (see FIGS. 3 and 4).

In normal usage, the peripheral surface 11 of applicator roller 10 will not come into contact with the ground. However, where the apparatus is utilized so that the roller surface 11 will be close to the ground (e.g. between crop rows) it is desirable to provide some accessory mechanism to prevent carrying dirt back to the liquid transfer means (e.g. sponge 23 or transfer rollers 26, 27). This is accomplished by providing wiper means 30 positioned at the bottom of the housing 16 at the re-entry area of the roller periphery 11 into the housing 16 having once passed through the open bottom thereof. The wiper means 30 may comprise a wiper blade 31, for instance of rubber or like flexible, resilient material, removably mounted in housing lip 32. The blade 31 wipes all the liquid off and lets it fall to the ground to prevent carrying dirt into the housing 16. If desired, a similar wiper mounting structure 32 can be mounted on the opposite side of the roller 10 in case the roller 10 is utilized so that it is rotated in the opposite direction to that indicated in FIGS. 3 and 4. Only one wiper blade 31 is utilized at a time.

Means are also provided for mounting the housing 16 and roller 10 so that they are spaced from the ground, with the axis of rotation of the roller 10 being generally horizontal, and so that the roller 10 is positively rotated. One structure particularly useful for facilitating both of these functions is the drive wheel 35 illustrated in FIGS. 1, 3, 4 and 5. The drive wheel 35 is substantially larger in diameter than the applicator roller 10, and the peripheral surface thereof and the raised portion 14 of the roller 10, together, comprise surface means for effecting rotation of the roller 10 in response to rotation of the drive wheel 35, the roller 10 being driven by the drive wheel 35. The roller 10 is rotated by the drive wheel 35 in a direction of rotation opposite to the direction of rotation of the drive wheel 35. The drive wheel 35 engages the ground, being either pushed or pulled by an operator or by a tractor to which it is operatively mounted, and moves in the direction A (see FIGS. 3-6 in particular), which means that the direction of rotation of the roller 10 is such that it rotates into plants with which it comes in contact, providing a thorough wiping effect of liquid onto the plants.

A preferred means for mounting the drive wheel 35 to the housing 16 comprises a pair of bracket arms 37, 38, each mounted at one end thereof to an axle 39 for the drive wheel 35 so that the drive wheel 35 is rotatable with respect thereto, and pivotally mounted by pivot pins 40 or the like at the opposite ends thereof to the casing 16. Means are provided defining an interior slot 41 in the casing 16 through which the raised portion 14 of the roller 10 extends to engage the periphery of the drive wheel 35.

As illustrated in FIG. 3, means also are preferably provided for adjustably mounting at least one of the arms 37, 38 intermediate its ends to the housing 16 so that it is held stationary with respect to the housing at that point. This is preferably accomplished by providing a plurality of openings 43 in one or both side walls of the housing 16, with a corresponding opening formed in the arm 37, 38 corresponding thereto, and a nut and bolt assembly 44 passing through the openings and affixing the lever 37, 38 to the housing 16 at the area. By selecting the appropriate opening 43, the spacing of the roller 10 off of the ground may be adjusted to accommodate different terrain, vegetation or like conditions.

Figure 1:
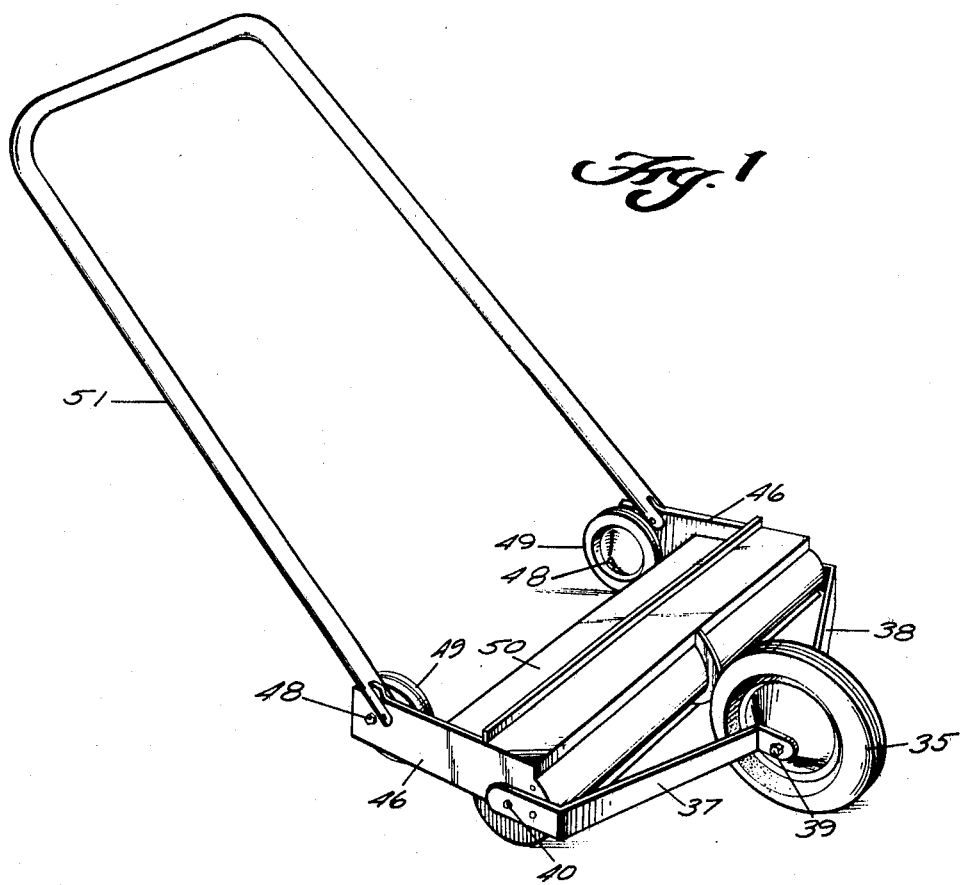
FIG. 1 is a perspective view of an exemplary apparatus according to the present invention.

Further means for mounting the housing 16 and roller 10 so that they are spaced from the ground are utilized in addition to, or in place of, the drive wheel 35. In order to provide the most adaptable structure possible, preferably a pair of horizontally spaced substantially horizontally elongated plates 46 are mounted to the housing 16 on an opposite side thereof as the drive wheel 35. Each plate 46 has bore means formed therein adapted to receive the axle of a ground engaging wheel, or a pivot pin for a lever. Where it is desirable to use the apparatus to be pushed or pulled by hand, as illustrated in FIG. 1, the axles 48 of a pair of small ground engaging wheels 49 are received by the bore means (e.g. bore 50) provided in the plates 46, serving to space the side of the housing 16 opposite the drive wheel 35 off of the ground. In this embodiment a handle 51 also is provided connected to the plates 46 and extending upwardly therefrom, as illustrated in FIG. 1.

Where it is desirable to mount the apparatus to a tractor tool bar, the bores 50 and he plates 46 receive pivot pins 53 at one end of each of the levers 54, the levers 54 (see FIGS. 5 and 6 in particular) having means, such as conventional brackets 55, formed at the opposite ends thereof for mounting on a tractor tool bar 56. The brackets 55 of course are adjustable along the length of the tool bar 56 to mount the apparatus in any desired position. In such embodiments, a chain 57 or like structure might also be provided for mounting to the tractor to lift the entire structure 16 into an inoperative position, or effect adjustment of the height thereof (where the adjustment means 43, 44 are not utilized but rather the bracket arms 37, 38 are pivoted at both ends thereof to the housing 16 and drive wheel 35, respectively).

Figure 6:
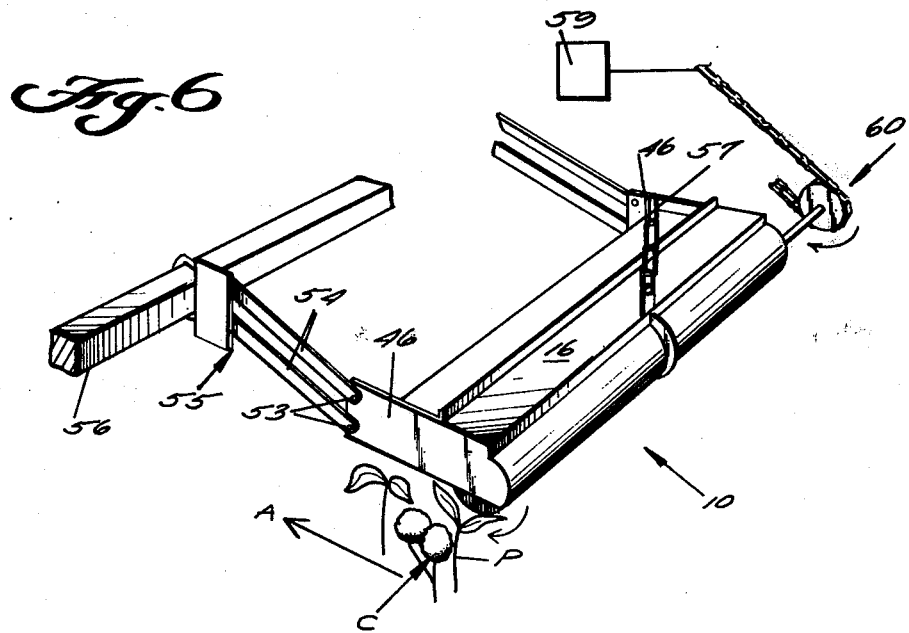
FIG. 6 is a perspective view of another form of the apparatus according to the present invention shown while in conjunction with a tractor tool bar.

In the embodiment illustrated in FIG. 6, the drive wheel 35 has been disconnected. The roller 10 is thus no longer driven by the drive wheel 35, but instead is driven by a small motor, illustrated schematically at 59 in FIG. 6, mounted on the tractor, with a chain and sprocket arrangement 60, or like means, effecting rotation of the roller 10 in the direction indicated by the arrows in FIG. 6. Instead of a motor 59, driving of the roller 10 may be effected utilizing a PTO shaft from the tractor, with suitable adapting apparatus. Of course any number of housing 16 with rollers 10 can be mounted along the tool bar 56, positioned at various vertical heights or with various spacings dependent upon whether between-row or above-row treatment is to be effected (or both at the same time with alternate units positioned in alternate manners).

The apparatus heretofore described is most suitable for use in the application of liquid contact herbicides, such as ROUNDUP manufactured by Monsanto Company, to plants to effect destruction of the plants. An exemplary manner of utilizing the apparatus heretofore described comprises (or consists of) the following steps:

(1) Mounting the applicator roller 10 above the ground in a position for the peripheral surface 11 thereof to be brought into contact with plants (e.g. see plants P in FIG. 6). The applicator roller 10 is in operative communication with a reservoir of liquid herbicide such as the liquid pool 18 and/or the remote reservoir 20. The reservoir 20 may be located at any remote location desired (such as a large tank on a tractor).

(2) Effecting movement of the applicator roller 11 in a direction A generally perpendicular to the axis of rotation (along spindles 13, 13) of the roller 10. This may be accomplished by pushing or pulling the handle 51 attached to the housing 16, or driving the tractor on which tool bar 56 is mounted in direction A. This step also may be practiced by moving the roller 10 just above ground level between rows of crops (e.g. see FIGS. 3 and 4) while positively preventing the roller from contacting crops in the rows (with the housing 16 sidewalls, or further auxillary guards if desired), or by moving the roller above the tops of crop plants (see C in FIG. 6) to contact any plants (see weeds P in FIG. 6) extending upwardly above the tops of the crop plants. When the roller 10 is positioned just above the ground, the further step of wiping the surface 11 of the roller 11 after it has come into contact with the plants, and before it has returned to be replenished by the liquid from the other reservoir, utilizing wiper blade 31, is also practiced.

(3) Effecting powered rotation of the applicator roller so that it rotates to contact plants and continuously transfers liquid from the surface 11 thereof onto the plants, the surface 11 being continuously replenished with liquid from the reservoir (e.g. 18 via sponge 23 or transfer rollers 26, 27). This step is preferably practiced by effecting rotation of the roller in a direction of rotation (see FIGS. 3-6) so that it rotates into plants with which it comes into contact, providing a thorough wiping effect of liquid herbicide onto the plants.

Another form of apparatus according to the present invention for transfering liquid onto the peripheral surface 14 of a roller 10, preferably for ultimate application of the liquid to plants, is illustrated in FIG. 7. The roller 10 illustrated in FIG. 7 is preferably mounted in any one of the manners illustrated in FIGS. 1 and 3 through 6 with the apparatus 118 for transfering liquid onto the surface 14 of the roller 10 mounted in the same manner as corresponding apparatus in FIGS. 3 and 4.

Apparatus 118 includes the liquid housing 119 which mounts a transfer means, such as sponge 120, therein. The transfer means 120 extends outwardly from the housing 119 (See FIG. 7) to contact the peripheral surface 14 of roller 10 and for transfering liquid from housing 119 to the surface 14. Means are provided mounted adjacent a portion of the sponge 120 on one side thereof for supplying liquid thereto. Such means preferably takes the form a liquid supply tube 121 having a plurality of openings formed in the bottom thereof along the length thereof, which length is substantially coextensive with the length of the roller 10, housing 119, and sponge 120. Liquid in tube 121 drips through the opening in the bottom thereof onto the sponge 120.

According to the present invention a storage tank is disposed below the housing substantially the entire length thereof, and means are provided defining a plurality of openings 123 (See FIGS. 7 and 8), in the bottom of the housing 119 for allowing drainage of liquid from the housing 119 into the tank, while the tank is separated from the sponge 120. Such an arrangement allows the utilization of a much smaller sponge than is utilized in the embodiment illustrated in FIG. 3.

It is, of course, desirable to construct the storage tank located below the housing 119 as inexpensively and as easily as possible. This may be accomplished, according to the present invention, by forming the storage tank from first and second elements 125, 126 respectively. The first element 125 is disposed above the second element 126 and rigidly attached thereto, with the bottom wall of the first element 125 tapering to form a drain point, with means defining the aperture 127 in the bottom wall of the first element 125 (and the top wall of the second element 126) allowing liquid flow from the first element 125 to the second element 126. The element 126 preferably comprises a tube having the ends thereof closed off, such as the end closed off by end plate 128 as illustrated in the drawings. The first element 125 is formed as tubular segment, the termination of the tubular segment being formed by a generally horizontally extending plane complimentary to the bottom of the liquid housing 119. The first element 125 is open at the top thereof, as illustrated in FIGS. 7 through 9.

The preferred manner of constructing the liquid storage tank utilize according to the invention is as follows:

(a) First, the second tubular members, such as sections of plastic pipe, are formed, each of the members elongated along a given axis. The members are illustrated as 126 and 125' in FIG. 9.

(b) The first member 125' is affixed on top of the second member 126 as by utilizing adhesive, plastic welding, or the like, so that the axes thereof are parallel and so that they are substantially coextensive.

(c) The ends of the second tubular member 126 are closed off, is indicated by end plate 128 in FIG. 9.

(d) The first tubular member 125' is cut along a plane 130 that does not intersect the second tubular member 126 along its physical extent, to provide an open portion of the first tubular member opposite the interconnection between the members. The article resulting is the tubular segment 125, the cutaway portion of the original tube 125' being illustrated in dotted line in FIG. 9.

(e) At least one liquid flow-allowing aperture 127 is formed between the first and second members, as by drilling a hole therebetween after the cut has been made along the plane 130.

(f) Complimentary bends 131 and 132 are provided in the members 125', 126, adjacent middle portions thereof. Preferably the bends 131, 132 are introduced by conventional pipe bending equipment and before the tubes 125' and 126 are attached together, although bending may also be practiced after they are attached together under suitable conditions. The aperture 127 is formed at the apex of the bend 131 in the first member (125), as illustrated more clearly in FIG. 8. In the preferred embodiment, as illustrated in the drawings, the plane 130, along which and with the first tubular member 125' is cut to form a first storage tank element 125, is parallel to the original pre-bending axes of the tubular members 125', 126.

The apparatus according to the present invention also includes means for circulating liquid from the storage tank to the liquid supplying tube 121. Such means may take the form of a conduit 135, (See FIG. 7) connected at one end thereof to the bottom bend 132 of storage tank second element 126, and connected at the other end thereof directly to the liquid supplying tube 121, with a pump 136 disposed in the conduit 135. The pump 136 and tube 121 would also, of course, be mounted by the roller housing (16 in FIG. 3). Alternatively, another liquid reservoir, such as reservoir 20 illustrated in FIG. 3, may be provided, and the pump 136 interconnected to that liquid reservoir, with another line provided between the reservoir find the tube 121 for metering liquid from the reservoir to the tube 121.

It will thus be seen that according to the present invention a simple yet effective apparatus for transferring liquid onto the surface of a roller, and preferably ultimately for transferring the liquid from the roller surface to plants, has been provided. Additionally, a simple and inexpensive storage tank has been provided for use with the liquid transfer apparatus, as well as a simple method of constructing the liquid storage tank.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for transferring liquid onto the surface of a roller, and comprising:
   a housing;
   transfer means disposed in said housing and extending outwardly therefrom to contact a roller peripheral surface and for transferring liquid from said housing to the roller surface;
   liquid supply means mounted above said transfer means for dripping liquid onto said transfer means;
   a storage tank disposed below, and connected to, said housing along substantially the entire length thereof, and separated from said housing by a bottom wall of said housing;
   means defining a plurality of openings in the bottom wall of said housing for allowing drainage of liquid from said housing into said storage tank; and
   powered means for actively circulating liquid from said storage tank to said means for supplying liquid to said transfer means.

2. Apparatus as recited in claim 1 wherein said transfer means comprises a sponge.

3. Apparatus for applying liquid to plants, comprising
   a liquid applicator roller for contacting plants and transferring liquid from the roller surface to the plants;
   a housing for mounting said roller for rotation about a given axis, and covering said roller at the top and sides but being open at the bottom to allow the peripheral surface of the roller to rotate out of the housing open bottom;
   means defining a liquid pool in said roller housing extending substantially the entire width of said roller housing and extending substantially the entire length of said applicator roller, said means comprising a liquid housing;
   transfer means disposed in said liquid housing and extending outwardly from said liquid housing into engagement with the peripheral surface of said applicator roller for depositing a film of liquid on said applicator roller surface just before it contacts plants;
   means for mounting said housing so that it is spaced from the ground and movable with respect to the ground in a direction generally perpendicular to said axis of rotation of said applicator roller, and so that said applicator roller is spaced from the ground and said axis of rotation thereof is horizontal;
   a storage tank disposed below said liquid housing;
   means defining a plurality of openings in the bottom of said liquid housing for allowing draining of liquid from said liquid housing into said storage tank;
   means mounted adjacent a portion of said transfer means for supplying liquid to said transfer means; and
   means for circulating liquid from said storage tank to said means for supplying liquid to said transfer means.

4. Apparatus as recited in claim 3 wherein said transfer means comprises a sponge disposed in said liquid housing and extending outwardly from said liquid housing into engagement with the peripheral surface of said applicator roller.

5. Apparatus as recited in claim 3 wherein said means defining a liquid housing in said roller housing locates said liquid housing on one side of said roller housing, the liquid housing being at the same general horizontal level as said applicator roller.

6. Apparatus as recited in claim 1 wherein said means for supplying liquid to said transfer means comprises liquid supply means mounted above said transfer means for dripping liquid onto said transfer means, and wherein said means for circulating liquid from said storage tank to said liquid supply means includes a pump means.

7. Apparatus as recited in claims 3, 4, 1 or 2 wherein said storage tank comprises a tubular element having closed off-ends; and a tubular segment attached to the top of said tubular element and having a termination formed by a horizontally horizontally extending plane complimentary to the bottom of said housing containing said transfer means, and being open at the top; and means providing liquid communication between said tubular segment and said tubular element.

8. Apparatus as recited in claims 3, 4, 1 or 2 wherein said storage tank comprises first and second elements, said first element being disposed above said second element and the bottom wall of said first element tapering to form a drain point and having means defining an opening allowing liquid flow from said first element to said second element at said drain point.

9. Apparatus as recited in claim 8 wherein said second tank element comprises a horizontally disposed tube having a downward bend formed at a middle portion thereof, which the ends thereof closed off, and wherein said first element comprises a tubular segment having a middle portion with a downward bend complimentary to the bend of said second element, the termination of said tubular segment being formed by a generally horizontally extending plane complimentary to the bottom of said liquid housing, said first element being open at the top thereof.

10. Apparatus as recited in claim 8 wherein said means for supplying liquid to said transfer means comprises a pipe disposed above said transfer means adjacent the roller, and having means defining a plurality of openings in a bottom portion thereof.

11. Apparatus as recited in claim 8 wherein said means for circulating liquid from said storage tank to said means for supplying liquid to said transfer means comprises a conduit extending from a bottom portion of said storage tank to said liquid supplying means, and a pump disposed in said conduit.

12. Apparatus for transferring liquid onto the surface of a roller, and comprising:
    a housing;
    transfer means disposed in said housing and extending outwardly therefrom to contact a roller peripheral surface and for transferring liquid from said housing to the roller surface;
    means mounted adjacent a portion of said transfer means on one side of said transfer means for supplying liquid to said transfer means;
    a storage tank disposed below said housing along substantially the entire length thereof, and separated from said housing by a housing bottom wall; said storage tank comprising: a tubular element having closed off-ends; and a tubular segment attached to the top of said tubular element and having a termination formed by a horizontally extending plane complimentary to the bottom of said housing containing said transfer means, and being open at the top; and means for providing liquid communication between said tubular segment and said tubular element;

means defining a plurality of openings in the bottom wall of said housing for allowing drainage of liquid from said housing into said storage tank; and means for circulating liquid from said storage tank to said means for supplying liquid to said transfer means.

13. Apparatus for transferring liquid onto the surface of a roller, and comprising:

a housing;

transfer means disposed in said housing and extending outwardly therefrom to contact a roller peripheral surface and for transferring liquid from said housing to the roller surface;

means mounted adjacent a portion of said transfer means on one side of said transfer means for supplying liquid to said transfer means;

a storage tank disposed below said housing along substantially the entire length thereof, and separated from said housing by a housing bottom wall;

said storage tank comprising: first and second elements, said first element being disposed above said second element and the bottom wall of said first element tapering to form a drain point and having means defining an opening allowing liquid flow from said first element to said second element at said drain point; said second tank element comprising a horizontally disposed tube having a downward bend formed at a middle portion thereof, which the ends thereof closed off; and said first element comprising a tubular segment having a middle portion with a downward bend complimentary to the bend of said second element, the termination of said tubular segment being formed by a generally horizontally extending plane complimentary to the bottom of said liquid housing, said first element being open at the top thereof;

means defining a plurality of openings in the bottom wall of said housing for allowing drainage of liquid from said housing into said storage tank, and means for circulating liquid from said storage tank to said means for supplying liquid to said transfer means.

* * * * *